United States Patent
Tripathy et al.

(10) Patent No.: US 10,459,886 B2
(45) Date of Patent: Oct. 29, 2019

(54) CLIENT-SIDE DEDUPLICATION WITH LOCAL CHUNK CACHING

(71) Applicant: Quest Software Inc., Aliso Viejo, CA (US)

(72) Inventors: Tarun K. Tripathy, Newark, CA (US); Brian R. Smith, San Ramon, CA (US); Abhijit S. Dinkar, San Jose, CA (US)

(73) Assignee: QUEST SOFTWARE INC., Aliso Viejo, CA (US)

(\*) Notice: Subject to any disclaimer, the term of this patent is extended or adjusted under 35 U.S.C. 154(b) by 0 days.

(21) Appl. No.: 14/453,158

(22) Filed: Aug. 6, 2014

(65) Prior Publication Data

US 2016/0041777 A1 Feb. 11, 2016

(51) Int. Cl.
*G06F 12/00* (2006.01)
*G06F 16/172* (2019.01)
*G06F 16/13* (2019.01)
*G06F 16/174* (2019.01)

(52) U.S. Cl.
CPC .......... *G06F 16/172* (2019.01); *G06F 16/137* (2019.01); *G06F 16/1752* (2019.01)

(58) Field of Classification Search
None
See application file for complete search history.

(56) References Cited

U.S. PATENT DOCUMENTS

| | | | |
|---|---|---|---|
| 5,761,722 A * | 6/1998 | Vishin | G06F 12/1063 711/118 |
| 5,826,082 A | 10/1998 | Bishop | |
| 6,085,247 A | 7/2000 | Parsons | |
| 6,661,801 B1 | 12/2003 | Richards | |
| 8,234,468 B1 | 7/2012 | Deshmukh | |
| 8,396,841 B1 | 3/2013 | Janakiraman | |
| 8,458,310 B1 | 6/2013 | Mayor | |
| 8,898,114 B1 | 11/2014 | Feathergill | |
| 9,007,239 B1 | 4/2015 | Lissack | |
| 9,098,424 B2 | 8/2015 | Hyde | |
| 9,172,771 B1 | 10/2015 | Gross | |
| 9,268,651 B1 | 2/2016 | Salyers | |
| 9,367,575 B1 * | 6/2016 | Bromley | G06F 17/30321 |
| 9,432,192 B1 | 8/2016 | Podge et al. | |

(Continued)

OTHER PUBLICATIONS

U.S. Appl. No. 14/453,121, Nov. 4, 2016, Non Final Rejection.

(Continued)

*Primary Examiner* — Daniel D Tsui

(74) *Attorney, Agent, or Firm* — Maschoff Brennan

(57) ABSTRACT

Techniques and mechanisms described herein facilitate the transmission of a data stream from a client device to a networked storage system. According to various embodiments, a fingerprint for a data chunk may be identified by applying a hash function to the data chunk via a processor. The data chunk may be determined by parsing a data stream at the client device. A determination may be made as to whether the data chunk is stored in a chunk file repository at the client device. A block map update request message including information for updating a block map may be transmitted to a networked storage system via a network. The block map may identify a designated memory location at which the chunk is stored at the networked storage system.

15 Claims, 8 Drawing Sheets

(56) References Cited

U.S. PATENT DOCUMENTS

| | | |
|---|---|---|
| 2004/0030951 A1 | 2/2004 | Armangau |
| 2005/0193245 A1 | 9/2005 | Hayden |
| 2005/0262167 A1 | 11/2005 | Teodosiu et al. |
| 2005/0268068 A1 | 12/2005 | Ignatius |
| 2006/0059173 A1 | 3/2006 | Hirsch |
| 2006/0150190 A1 | 7/2006 | Gusler |
| 2006/0184652 A1 | 8/2006 | Teodosiu et al. |
| 2006/0259949 A1 | 11/2006 | Schaefer |
| 2009/0063665 A1 | 3/2009 | Bagepalli |
| 2009/0190760 A1 | 7/2009 | Bojinov |
| 2009/0307251 A1 | 12/2009 | Heller |
| 2010/0070448 A1 | 3/2010 | Omoigui |
| 2010/0094847 A1 | 4/2010 | Malan |
| 2010/0217948 A1 | 8/2010 | Mason et al. |
| 2010/0228800 A1 | 9/2010 | Aston |
| 2010/0306354 A1 | 12/2010 | DeHaan |
| 2010/0332401 A1 | 12/2010 | Prahlad |
| 2011/0179341 A1 | 7/2011 | Falls |
| 2011/0187817 A1 | 8/2011 | Sasaki |
| 2011/0307456 A1 | 12/2011 | Jayaraman |
| 2012/0089579 A1 | 4/2012 | Ranade |
| 2012/0136850 A1 | 5/2012 | Barsness |
| 2012/0191738 A1 | 7/2012 | Koifman |
| 2012/0254417 A1 | 10/2012 | Luna |
| 2012/0265954 A1 | 10/2012 | Haustein |
| 2013/0055374 A1 | 2/2013 | Kustarz |
| 2013/0060777 A1 | 3/2013 | Grube |
| 2013/0067237 A1 | 3/2013 | Huang |
| 2013/0097380 A1* | 4/2013 | Colgrove .......... G06F 17/30159 711/118 |
| 2013/0138620 A1* | 5/2013 | Yakushev ......... G06F 17/30156 707/698 |
| 2013/0232160 A1 | 9/2013 | Tibble |
| 2013/0297569 A1 | 11/2013 | Hyde |
| 2014/0046997 A1 | 2/2014 | Dain |
| 2014/0075024 A1 | 3/2014 | Koza |
| 2014/0114932 A1 | 4/2014 | Mallaiah |
| 2014/0123160 A1 | 5/2014 | van Coppenolle et al. |
| 2014/0189281 A1 | 7/2014 | Sokol |
| 2014/0214776 A1 | 7/2014 | Bolte |
| 2014/0280664 A1* | 9/2014 | Sengupta ............ H04L 67/2842 709/212 |
| 2015/0012503 A1 | 1/2015 | Akirav |
| 2015/0186370 A1 | 7/2015 | Xu et al. |
| 2016/0041777 A1 | 1/2016 | Tripathy |
| 2016/0044100 A1* | 2/2016 | Tripathy ............ H04L 67/1095 709/219 |
| 2016/0225732 A1 | 8/2016 | Kim |

OTHER PUBLICATIONS

U.S. Appl. No. 14/453,121, Mar. 24, 2017, Final Rejection.
U.S. Appl. No. 14/453,165, Sep. 22, 2016, Non-Final Rejection.
U.S. Appl. No. 14/453,165, Jan. 25, 2017, Non-Final Rejection.
U.S. Appl. No. 14/453,173, Dec. 16, 2016, Non-Final Rejection.
U.S. Appl. No. 14/453,173, May 16, 2017, Final Rejection.
U.S. Appl. No. 14/453,173, Aug. 25, 2017, Non-Final Rejection.
U.S. Appl. No. 14/453,150, Jun. 16, 2016, Non-Final Rejection.
U.S. Appl. No. 14/453,150, Dec. 30, 2016, Non-Final Rejection.
U.S. Appl. No. 14/453,150, Jun. 23, 2017, Non-Final Rejection.

* cited by examiner

CLIENT-SIDE DEDUPLICATION WITH LOCAL CHUNK CACHING

TECHNICAL FIELD

The present disclosure relates generally to data storage, and more specifically to the operation of client devices in communication with network-accessible or network-attached storage systems.

DESCRIPTION OF RELATED ART

Data is often stored in storage systems that are accessed via a network. Network-accessible storage systems allow potentially many different client devices to share the same set of storage resources. A network-accessible storage system can perform various operations that render storage more convenient, efficient, and secure. For instance, a network-accessible storage system can receive and retain potentially many versions of backup data for files stored at a client device. As well, a network-accessible storage system can serve as a shared file repository for making a file or files available to more than one client device.

Some data storage systems may perform operations related to data deduplication. In computing, data deduplication is a specialized data compression technique for eliminating duplicate copies of repeating data. Deduplication techniques may be used to improve storage utilization or network data transfers by effectively reducing the number of bytes that must be sent or stored. In the deduplication process, unique chunks of data, or byte patterns, are identified and stored during a process of analysis. As the analysis continues, other chunks are compared to the stored copy and a redundant chunk may be replaced with a small reference that points to the stored chunk. Given that the same byte pattern may occur dozens, hundreds, or even thousands of times, the amount of data that must be stored or transferred can be greatly reduced. The match frequency may depend at least in part on the chunk size. Different storage systems may employ different chunk sizes or may support variable chunk sizes.

Deduplication differs from standard file compression techniques. While standard file compression techniques typically identify short repeated substrings inside individual files, storage-based data deduplication involves inspecting potentially large volumes of data and identify potentially large sections—such as entire files or large sections of files—that are identical, in order to store only one copy of a duplicate section. In some instances, this copy may be additionally compressed by single-file compression techniques. For example, a typical email system might contain many instances of the same one megabyte (MB) file attachment. In conventional backup systems, each time the system is backed up, all 100 instances of the attachment are saved, requiring 100 MB storage space. With data deduplication, the storage space required may be limited to only one instance of the attachment. Subsequent instances may be referenced back to the saved copy for deduplication ratio of roughly 100 to 1.

SUMMARY

The following presents a simplified summary of the disclosure in order to provide a basic understanding of certain embodiments of the invention. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In general, certain embodiments of the present invention provide mechanisms for transmitting a data stream from a client device to a networked storage system. According to various embodiments, a fingerprint for a data chunk may be identified by applying a hash function to the data chunk via a processor. The data chunk may be determined by parsing a data stream at the client device. A determination may be made as to whether the data chunk is stored in a chunk file repository at the client device. A block map update request message including information for updating a block map may be transmitted to a networked storage system via a network. The block map may identify a designated memory location at which the chunk is stored at the networked storage system.

According to various embodiments, a determination may be made as to whether the data chunk is stored at the networked storage system by transmitting the fingerprint to the networked storage system via the network, for instance when it the data chunk is not stored in the local chunk cache. When the data chunk is not stored at the networked storage system, the data chunk may be transmitted to the networked storage system for storage. A fingerprint status message indicating whether the chunk associated with the fingerprint is stored at the networked storage system may be received from the networked storage system.

In some implementations, wherein determining whether the data chunk is stored in the chunk cache may involve comparing the fingerprint for the data chunk with a fingerprint index associated with the chunk cache. The designated memory location may identify an existing memory location associated with the data chunk when the data chunk is stored at the networked storage system at the existing memory location. The data chunk may be determined at least in part via a rolling hash parsing technique operable to generate at least some identical chunks when parsing different but overlapping data streams.

According to various embodiments, the networked storage system may be operable to store deduplicated data based on storage requests received via the network. The data stream is generated at the client device via a network storage protocol such as the Network File System (NFS) protocol, the Common Internet File System (CIFS) protocol, or the Open Storage (OST) protocol. The hash function may be MD5, SHA-1, or a different hash function.

BRIEF DESCRIPTION OF THE DRAWINGS

The disclosure may best be understood by reference to the following description taken in conjunction with the accompanying drawings, which illustrate particular embodiments of the present invention.

DESCRIPTION OF PARTICULAR EMBODIMENTS

Figure 1:
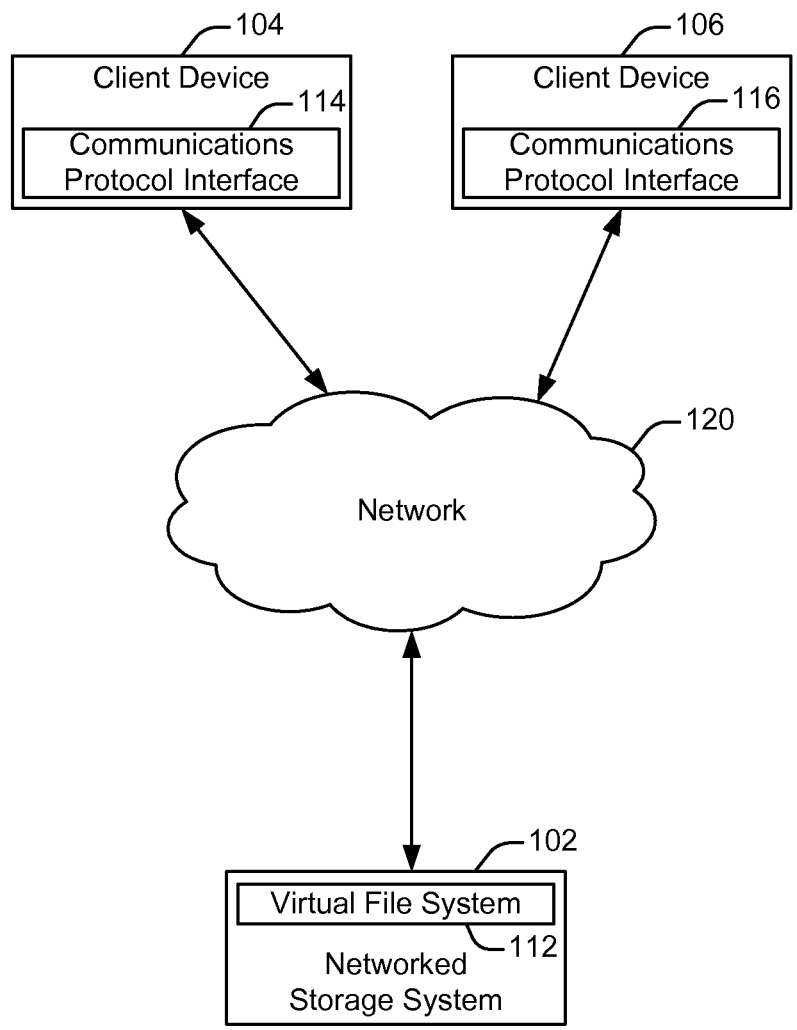
FIG. 1 shows an example of a network storage network storage arrangement, arranged in accordance with one or more embodiments.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques and mechanisms of the present invention will be described in the context of particular data storage mechanisms. However, it should be noted that the techniques and mechanisms of the present invention apply to a variety of different data storage mechanisms. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

According to various embodiments, techniques and mechanisms described herein may facilitate sophisticated interactions between a client device and a networked storage system. For instance, a customized implementation of a communications protocol interface may be used to perform operations such as client-side deduplication. A networked storage system may include a parser configured to parse a data stream into chunks for storage and a fingerprinter configured to determine a fingerprint for each of the chunks. The storage of duplicate chunks may be avoided by comparing the fingerprints of new chunks with the fingerprints of chunks already stored at the networked storage system. The parser and fingerprinter may also be implemented at a client device in communication with the networked storage system via a network. Then, the client device may parse and fingerprint a data stream before sending data to the networked storage system to avoid sending chunks already stored on the networked storage system. The client device may maintain a chunk cache in which a number of recently processed chunks are stored at the client device. When the client device processes a chunk that already exists in the chunk cache, the fingerprint query to the networked storage system may be avoided. Alternately, or additionally, the client device may retrieve a chunk directly from the cache to satisfy a read request instead of retrieving the cache from the networked storage system.

Example Embodiments

Client devices frequently employ non-proprietary and commonly available communication protocols such as the Network File System (NFS) and the Common Internet File System (CIFS) to communicate with networked storage systems. For instance, many common backup software suites are configured transmit data over a network through these channels. However, these standard communication protocols transmit data "as-is" and perform little or no optimization at the client device. Various caching strategies are employed to increase data transfer performance. However, data-intrinsic strategies are not employed in these file transfer protocols. For instance, these standard communication protocols do not perform client-side deduplication, compression, encryption, or other such operations. Thus, many common backup configurations frequently send data to a networked storage system that is already stored on the networked storage system.

Client devices may also employ proprietary communications protocols such as Open Storage (OST) to communicate with networked storage systems. For instance, many common backup software suites are configured transmit data over a network through these channels. Some proprietary communications protocols incorporate proprietary technologies in order to boost performance. For instance, a client module implementing a propriety communications protocol may implement client-side deduplication. However, many backup and networked storage solutions are not configured to use these proprietary communications protocols. Moreover, purchasing backup and networked storage solutions that use these proprietary communications protocols may be expensive and may lock the purchaser in to the proprietary protocol.

According to various embodiments, a standard communications protocol interface for a network communications protocols such as NFS or CIFS may be supplemented at a client device with custom communications protocol interface. The custom communications protocol interface may be operable to communicate with other modules at the client device via the standard communications protocol. However, the custom communications protocol interface may include features that facilitate various non-standard interactions with a networked storage system. For instance, the custom communications protocol interface may include a parser and/or fingerprinter to facilitate client-side data deduplication.

In particular embodiments, a client device configured to use a particular communications protocol can enjoy improved performance without changing the protocol from the perspective of other modules at the client device. For example, backup software at the client device may be configured to access an NFS or CIFS mount point for backup and/or restore operations. In this example, by transparently using a custom communications protocol interface that communicates via a standard non-proprietary communications protocol such as NFS or CIFS, the backup software can continue to communicate via the same protocol. However, performance can potentially be improved by non-standard performance improvement techniques implemented in the custom communications protocol interface.

According to various embodiments, data may be deduplicated at the client device. For instance, a data stream designated for storage on the networked storage system may be parsed at the client device using the same parser that exists on the networked storage device. The parser may break the data stream into one or more data chunks, which may be fingerprinted using the same fingerprinter that is used at the networked storage system. The client device may then consult with the networked storage system to determine whether a chunk is already stored at the networked storage system before transmitting the chunk over the network. For instance, the client device may communicate with the networked storage system via custom communications protocol semantics associated with a custom communications protocol.

According to various embodiments, the client device may maintain a chunk cache in which data and/or metadata associated with a number of previously processed chunks is stored. For instance, the chunk cache may include recently and/or frequently processed chunks. Additionally, the chunk cache may include fingerprints associated with such chunks. Chunks and/or chunk fingerprints may be indexed, for instance via a Berkeley Database (BDB) system, a MySQL system, or any other suitable indexing system.

In particular embodiments, when the client device transfers a chunk to a networked storage system operable to store deduplicated data, the client device may also store the chunk in the chunk file and update the index with the chunk fingerprint. The chunk cache may store, for instance, a limited number of chunks or a limited amount of data.

According to various embodiments, when a client device processes a new chunk for transfer to the networked storage system, the client device may check whether the chunk is stored in the chunk cache. For instance, the client device may compute a fingerprint associated with the chunk and look up the computed fingerprint in an index associated with the chunk cache. If the chunk is stored in the cache, then the client device can avoid transmitting a fingerprint query to the networked storage system. Instead, the client device can simply instruct the networked storage system to update a record such as a block map and/or metadata server entry.

In some embodiments, a file read request at the client device may be handled by consulting the chunk cache. For instance, the client device may transmit a message to the networked storage system to retrieve information such as a file offset that indicates the beginning of a chunk within a file, a fingerprint associated with the chunk, and/or a length of the chunk. When this information is provided, the client device may use the information to determine whether the chunk is stored in the chunk cache. If the chunk is stored in the chunk cache, then the chunk may be retrieved directly from the chunk cache without needed to transmit the chunk over the network from the server.

According to various embodiments, use of the chunk cache may provide one or more performance benefits in various contexts. For example, when reading a data stream from a networked storage system, a client machine may first consult the chunk cache before requesting a chunk from the networked storage system. If a chunk is stored in the chunk cache, then a request to the networked storage system via the network may be avoided, thus reducing data transfer usage. Techniques for employing a chunk cache while reading a data stream from a networked storage system are discussed in additional detail with respect to FIG. 8.

As another example, when writing a data stream to a networked storage system, a client machine may first consult the chunk cache before transmitting a fingerprint query to the networked storage system. If a chunk is already stored in the chunk cache at the client machine, then no fingerprint query is necessary. In some instances, transmitting a chunk to the networked storage system may also be unnecessary if the chunk is stored in the chunk cache. Techniques for employing a chunk cache while writing a data stream to a networked storage system are discussed in additional detail with respect to FIG. 5.

In particular embodiments, chunks may be maintained in the chunk cache based on any of various parameters or characteristics. For example, the chunk cache may be subject to a maximum size and/or maximum number of chunks. As another example, the chunk cache may store chunks that were recently accessed. As yet another example, the chunk cache may store chunks with a relatively higher "heat factor" that indicates the number of times the chunk was accessed in a recent period of time.

FIG. 1 shows an example of a network storage arrangement, arranged in accordance with one or more embodiments. The network storage arrangement shown in FIG. 1 includes a networked storage system 102 in communication with client devices 104 and 106 via a network 120. The client devices are configured to communication with the networked storage system 102 via the communications protocol interfaces 114 and 116. The networked storage system 102 is configured to process file-related requests from the client devices via the virtual file system 102.

According to various embodiments, the client devices and networked storage system shown in FIG. 1 may communicate via a network 120. The network 120 may include any nodes or links for facilitating communication between the end points. For instance, the network 120 may include one or more WANs, LANs, MANs, WLANs, or any other type of communication linkage.

In some implementations, the networked storage system 102 may be any network-accessible device or combination of devices configured to store information received via a communications link. For instance, the networked storage system 102 may include one or more DR6000 storage appliances provided by Dell Computer of Round Rock, Tex.

In some embodiments, the networked storage system 102 may be operable to provide one or more storage-related services in addition to simple file storage. For instance, the networked storage system 102 may be configured to provide deduplication services for data stored on the storage system. Alternately, or additionally, the networked storage system 102 may be configured to provide backup-specific storage services for storing backup data received via a communication link.

According to various embodiments, each of the client devices 104 and 106 may be any computing device configured to communicate with the networked storage system 102 via a network or other communications link. For instance, a client device may be a desktop computer, a laptop computer, another networked storage system, a mobile computing device, or any other type of computing device. Although FIG. 1 shows two client devices, other network storage arrangements may include any number of client devices. For instance, corporate networks often include many client devices in communication with the same networked storage system.

According to various embodiments, the client devices may communicate with the networked storage system 102 via the communications protocol interfaces 114 and 116. Different client devices may employ the same communications protocol interface or may employ different communications protocol interfaces. The communications protocol interfaces 114 and 116 shown in FIG. 1 may function as channel protocols that include a file-level system of rules for data exchange between computers. For example, a communications protocol may support file-related operations such as creating a file, opening a file, reading from a file, writing to a file, committing changes made to a file, listing a directory, creating a directory, etc. Types of communication protocol interfaces that may be supported may include, but are not limited to: Network File System (NFS), Common Internet File System (CIFS), Server Message Block (SMB), Open Storage (OST), Web Distributed Authoring and Versioning (WebDAV), File Transfer Protocol (FTP), Trivial File Transfer Protocol (TFTP).

In some implementations, a client device may communicate with a networked storage system using the NFS protocol. NFS is a distributed file system protocol that allows a client computer to access files over a network in a fashion similar to accessing files stored locally on the client computer. NFS is an open standard, allowing anyone to implement the protocol. NFS is considered to be a stateless protocol. A stateless protocol may be better able to withstand a server failure in a remote storage location such as the networked storage system 102. NFS also supports a two-phased commit approach to data storage. In a two-phased commit approach, data is written non-persistently to a storage location and then committed after a relatively large amount of data is buffered, which may provide improved efficiency relative to some other data storage techniques.

In some implementations, a client device may communicate with a networked storage system using the CIFS protocol. CIFS operates as an application-layer network protocol. CIFS is provided by Microsoft of Redmond Wash. and is a stateful protocol.

In some embodiments, a client device may communicate with a networked storage system using the OST protocol provided by NetBackup.

In some embodiments, different client devices on the same network may communicate via different communication protocol interfaces. For instance, one client device may run a Linux-based operating system and communicate with a networked storage system via NFS. On the same network, a different client device may run a Windows-based operating system and communicate with the same networked storage system via CIFS. Then, still another client device on the network may employ a NetBackup backup storage solution and use the OST protocol to communicate with the networked storage system 102.

According to various embodiments, the virtual file system layer (VFS) 102 is configured to provide an interface for client devices using potentially different communications protocol interfaces to interact with protocol-mandated operations of the networked storage system 102. For instance, the virtual file system 102 may be configured to send and receive communications via NFS, CIFS, OST or any other appropriate protocol associated with a client device.

In some implementations, the network storage arrangement shown in FIG. 1 may be operable to support a variety of storage-related operations. For example, the client device 104 may use the communications protocol interface 114 to create a file on the networked storage system 112, to store data to the file, to commit the changes to memory, and to close the file. As another example, the client device 106 may use the communications protocol interface 116 to open a file on the networked storage system 102, to read data from the file, and to close the file.

In particular embodiments, a communications protocol interface 114 may be configured to perform various techniques and operations described herein. For instance, a customized implementation of an NFS, CIFS, or OST communications protocol interface may allow more sophisticated interactions between a client device and a networked storage system.

According to various embodiments, a customized communications protocol interface may appear to be a standard communications protocol interface from the perspective of the client device. For instance, a customized communications protocol interface for NFS, CIFS, or OST may be configured to receive instructions and provide information to other modules at the client device via standard NFS, CIFS, or OST formats. However, the customized communications protocol interface may be operable to perform non-standard operations such as a client-side data deduplication.

Figure 2:
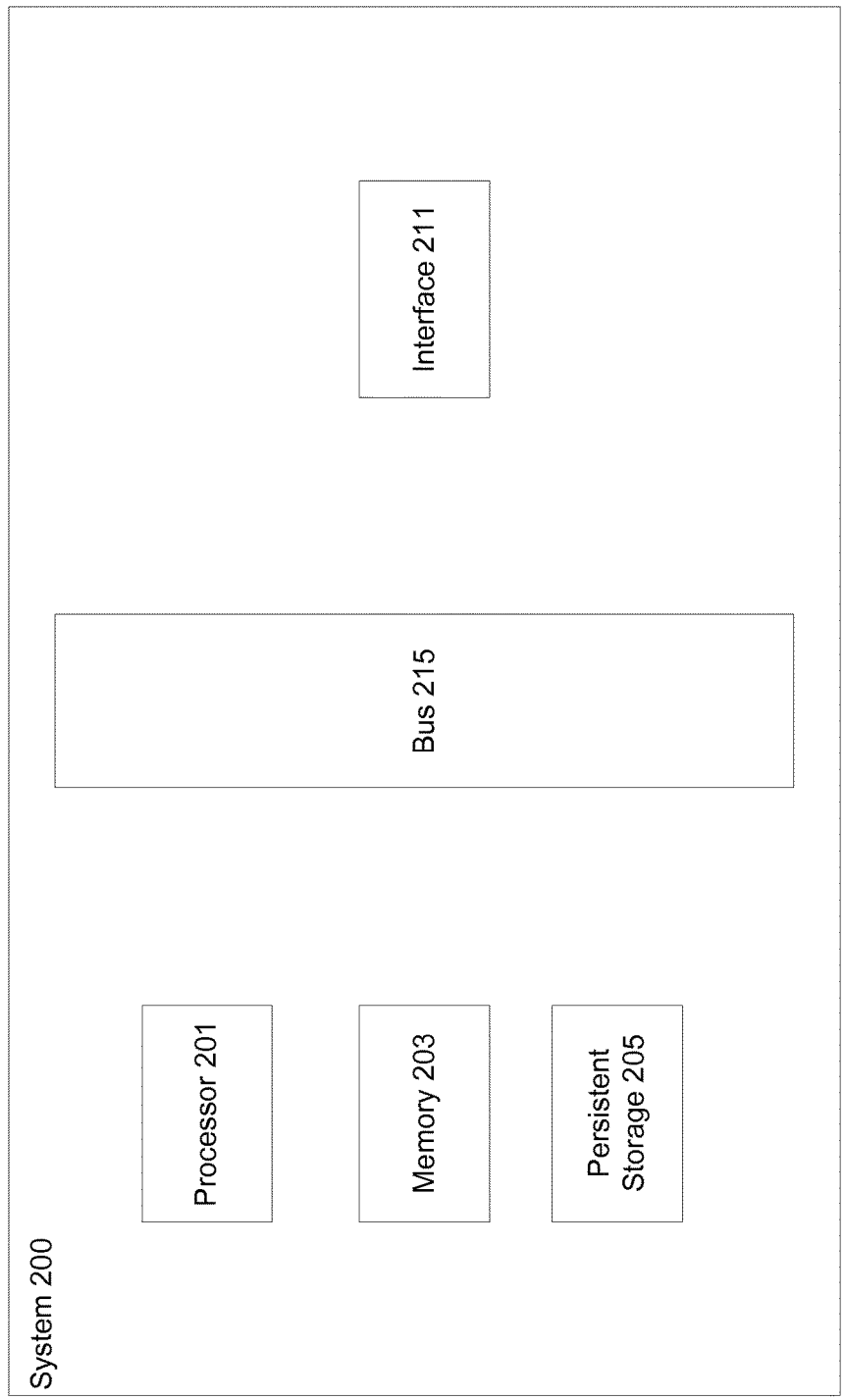
FIG. 2 illustrates a particular example of a system that can be used in conjunction with the techniques and mechanisms of the present invention.

FIG. 2 illustrates a particular example of a system that can be used in conjunction with the techniques and mechanisms of the present invention. According to particular example embodiments, a system 200 suitable for implementing particular embodiments of the present invention includes a processor 201, a memory 203, an interface 211, persistent storage 205, and a bus 215 (e.g., a PCI bus). For example, the system 200 may act as a client device such as the client device 104 or the client device 106 shown in FIG. 1. When acting under the control of appropriate software or firmware, the processor 201 is responsible for such tasks such as generating instructions to store or retrieve data on a remote storage system. Various specially configured devices can also be used in place of a processor 201 or in addition to processor 201. The complete implementation can also be done in custom hardware. The interface 211 is typically configured to send and receive data packets or data segments over a network. Particular examples of interfaces the device supports include Ethernet interfaces, frame relay interfaces, cable interfaces, DSL interfaces, token ring interfaces, and the like. Persistent storage 205 may include disks, disk arrays, tape devices, solid state storage, etc.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 200 uses memory 203 to store data and program instructions and maintain a local side cache. The program instructions may control the operation of an operating system and/or one or more applications, for example. The memory or memories may also be configured to store received metadata and batch requested metadata.

Figure 3:
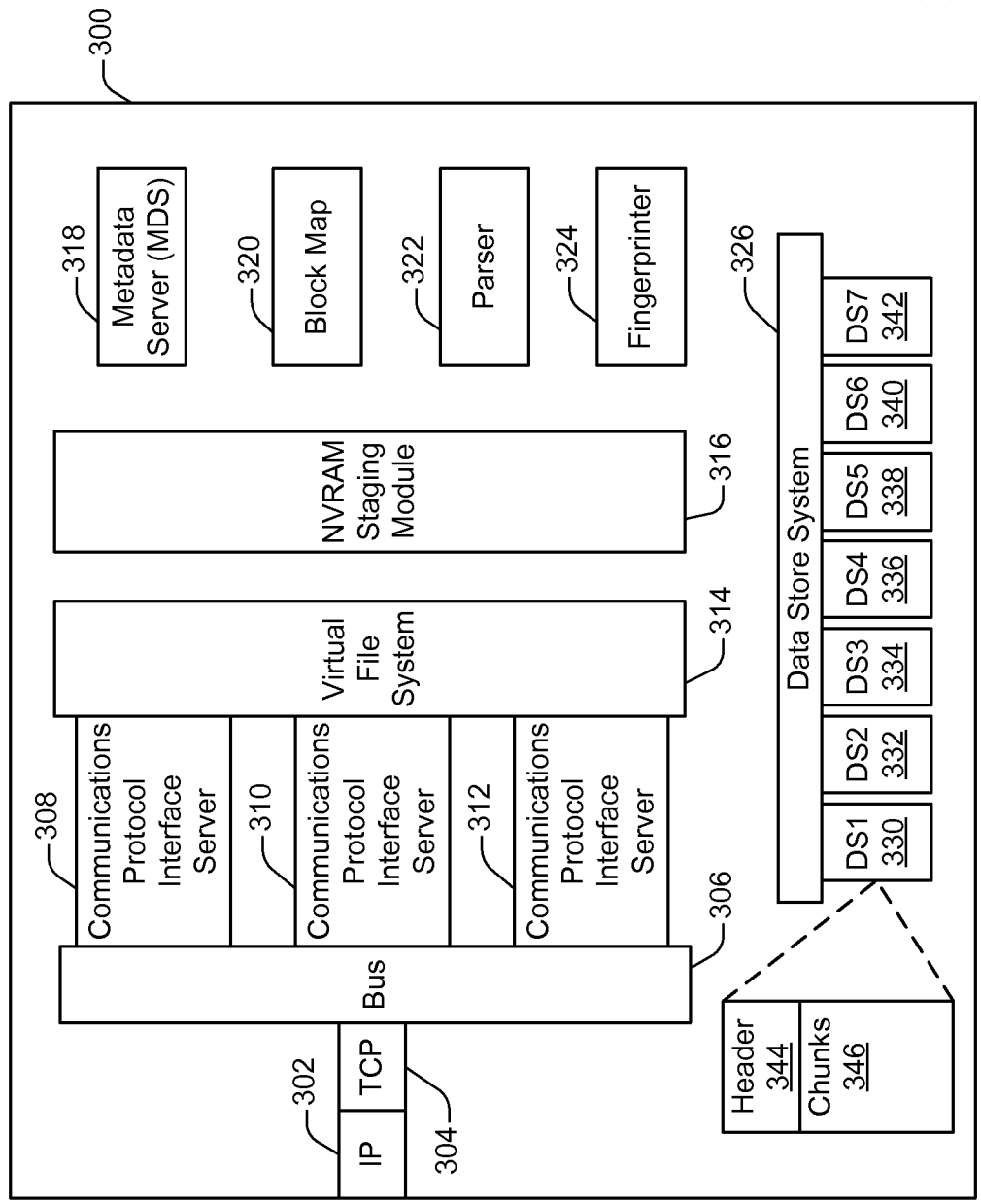
FIG. 3 illustrates a particular example of a networked storage system, configured in accordance with one or more embodiments.

FIG. 3 illustrates an example of a networked storage system 300, configured in accordance with one or more embodiments. The networked storage system 300 may be operable to communicate with one or more client devices via a network. The communications may be conducted via one or more communications protocols such as NFS, CIFS, or OST.

The networked storage system 300 includes TCP/IP interfaces 302 and 304 in communication with communications protocol interface servers 308, 310, and 312 via a bus 306. The communications protocol interface servers are configured to facilitate various storage operations by communicating with the virtual file system 314. The networked storage system 300 includes an NVRAM module 318 configured to temporarily store data such as file data designated for storage in the storage system 300. The networked storage system 300 also includes a metadata server (MDS) 318, a block map 320, a parser 322, a fingerprinter 324, and a data store system 326. The data store system is configured to manage the data stores 330-342.

At 302, an Internet Protocol (IP) communications interface is shown. According to various embodiments, the IP communications interface 302 is configured to send and receive packets based on IP addresses in packet headers. For instance, the IP communications interface 302 may send packets to client devices and receive packets from client devices via a network.

In some implementations, the IP communications interface 302 may communicate with the TCP communications interface 304. In some implementations, the TCP communications interface 304 may provide for reliable, ordered, and error-checked delivery of a data stream between programs running on computers connected to a network. For instance, the TCP communications interface 304 may be responsible for ensuring that packets reach their destinations and, when necessary, resending packets.

According to various embodiments, a data stream between the storage system 300 and a client device may be routed through a communications protocol interface server based on the communications protocol used by the client device. For instance, each communications protocol interface server may be operable to send and receive communications via a protocol such as NFS or CIFS. The storage system 300 includes the communications protocol interface servers 308, 310, and 312. However, implementations of a storage system may include one, two, three, or any number of communications protocol interface servers. Communications between the TCP/IP interfaces 302 and 304 and the communications protocol interface servers 308, 310, and 312 may be transmitted via the bus 306.

In some implementations, each of the communications protocol interface servers may be configured to communicate with the virtual file system 314. The virtual file system 314 provides an interface between the different communications protocol interface servers and the more concrete file system of the storage system 300. For instance, the VFS supports operations which may include but are not limited to: creating a file, opening a file, reading a directory, making a directory, unlinking or removing a file, removing a directory, closing a file, syncing or committing a change to a file, writing to a file, and reading from a file. Instructions to perform such operations may be received via a standard interface implemented by different communications protocol interface servers. In this way, an instruction to perform a file operation such as creating a file may be transmitted via any of several protocols and implemented in a standard way by the virtual file system 314.

In some embodiments, the NVRAM staging module 316 may temporarily store data for any of various purposes. For instance, the NVRAM staging module may store data received in write requests from a client device. Then, the data may be written to the data store system 326 when the write requests are committed or synchronized.

According to various embodiments, the parser 322 may be configured to receive a stream of data and separate the data into chunks for storage in the data store system 326. The parser 322 may be configured in such a way that two data streams identical except for offset will be reliably parsed into the same chunks. Also, two similar and well-ordered data streams may be reliably parsed in a similar fashion. In this way, data streams may be parsed into chunks in a manner likely to frequently generate duplicate chunks when similar data is provided to the parser. Then, the system can employ deduplication techniques to avoid storing duplicate copies of the same data.

Various techniques exist for parsing a data stream into chunks. In particular embodiments, the parser may employ a rolling hash technique such as Rabin-Karp. The parser may parse a data stream in increments such as 8 bytes. The hash may be computed in a rolling fashion. When the rolling hash is generated, a computed hash value may be compared with one or more criteria to determine whether the computed hash value qualifies as a chunk boundary. For instance, one criterion may indicate that a chunk boundary has been reached when the computed hash value is a prime number. The parser may also enforce a minimum and/or maximum chunk size. For example, chunks may be limited in size to between 16 and 48 kilobytes. Alternately, different chunk size restrictions may be used for different types of data presented. In this way, similar data streams may be parsed into similar chunks.

In particular embodiments, different chunks associated with the same file may be stored at different locations in the data store system 326. Alternately, or additionally, a single chunk may potentially include data from more than one file. The metadata server (MDS) 318 may maintain information about which files are stored on the storage system 318. The block map 320 may maintain information about where the chunks associated with each file are stored in the data store system 326.

In some embodiments, the metadata server 318 is operable to maintain one or more namespaces for data stored on the storage system 300. For instance, when a file is created, an MDS entry may be created in the metadata server 318. The MDS entry may include the file's name and point to a block map, which functions similarly to a UNIX system inode. For instance, an MDS entry representing a client file in the MDS 318 may point to a block map containing several entries in the block map 320.

In some embodiments, the storage system 300 may include a fingerprinter such as the fingerprinter 324. The fingerprinter 324 may generates a fingerprint of a chunk for purposes such as identification and deduplication. A fingerprint may also be referred to as a hash value or a checksum. For instance, the fingerprinter 324 may compute a hash value using a hash function such as MD5, or SHA-1, SHA-256, another Secure Hash Algorithm (SHA) hash function, or any other suitable hash function.

According to various embodiments, the block map 320, which functions similarly to a UNIX system inode, is operable to maintain entries indicating the storage locations for data associated with files stored in the storage system 320. Each block map entry may designate a portion of a file that is stored in the chunk. For instance, a block map entry may designate a file offset that indicates which portion of the file is stored in the chunk. Each block map entry may also designate a data store ID that identifies a particular data store in the data store system 326 where the aforementioned chunk can be found. Each data store may include one or more chunks.

According to various embodiments, the data store system 326 may be configured to store information parsed by the parser 322. The configuration of the data store system 326 may be strategically determined based on the underlying storage technology. For instance, the data store system 326 may be configured to store data on one or more storage disks configured in accordance with the Redundant Array of Independent Disks (RAID) storage standard.

In particular embodiments, the data store system 326 may include a plurality of data stores, such as the data stores 330-342. In the storage system 300, only seven data stores are shown. However, the number of data stores may depend on factors such as the amount of data stored in the storage system. For instance, data store systems commonly include millions of data stores in a single system.

In some embodiments, each data store may be configured to store one or more chunks. For example, a data store may be configured to store up to a designated number of chunks, such as 1024. As another example, a data store may be configured to store up to a designated amount of data, such as 20 GB. The configuration of the data store parameters may be strategically determined based on the underlying storage technology.

According to various embodiments, each data store may be associated with a unique identifier. The data store may include a header portion and a chunk portion. For instance, the data store 330 includes the header portion 344 and the chunk portion 346. The chunk portion 346 stores the data included in the chunks. The header portion stores metadata associated with the chunks. For instance, the header portion may include one header entry for each chunk stored in the data store. Each entry may include the chunk fingerprint generated by the fingerprinter 324, the offset within the data store that indicates where in the data store the chunk is stored. In particular embodiments, the header portion may be indexed to facilitate rapid search.

Figure 4:
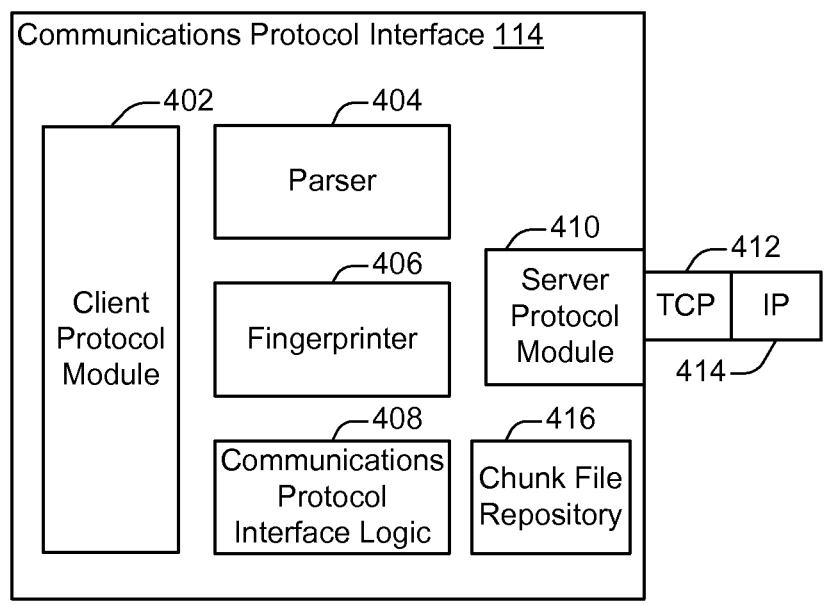
FIG. 4 illustrates an example of a communications protocol interface, configured in accordance with one or more embodiments.

FIG. 4 illustrates an example of a communications protocol interface 114, configured in accordance with one or more embodiments. The communications protocol interface 114 may be located at a client device and configured to facilitate potentially complex interactions between the client device and a remote server such as a networked storage system.

According to various embodiments, the communications protocol interface 114 includes a client protocol module 402, a parser 404, a fingerprinter 406, communications protocol interface logic 408, a chunk cache 416, and a server protocol module 410. The communications protocol interface 114 may be communicably coupled with TCP/IP interfaces 412 and 414 which may facilitate communications with a remote server. The TCP/IP interfaces 412 and 414 may be substantially similar to the TCP/IP modules 302 and 304 discussed with respect to FIG. 3.

In particular embodiments, the communications protocol interface 114 may be configured to appear to other modules at the client device as a conventional communications protocol interface while at the same time performing unconventional tasks such as client-side deduplication. The communications protocol interface 114 may perform such tasks at least in part by incorporating one or more components similar to those more conventionally found in a remote server.

According to various embodiments, the communications protocol interface 114 may implement a parser and fingerprinter substantially similar to those present at a networked storage system. Applying the same parsing and fingerprinting techniques at communications protocol interface 114 located at the client device may allow for operations such as client-side deduplication. For instance, rather than blindly sending data from the client device to a networked storage system when that data may be a duplicate of data already stored at the networked storage system, the communications protocol interface may first parse and fingerprint the data. Then, the client device may communicate with the networked storage system to determine whether the data needs to be sent. If the data does not need to be sent, then bandwidth may be reduced. If the data does need to be sent, then the data may be stored directly in storage at the networked storage system without necessarily performing server-side deduplication of the data. In this way, bandwidth usage and/or server-side resources may be conserved.

According to various embodiments, the client protocol module may be configured to allow the communications protocol interface 114 to communicate with other modules at the client device via a standard communications protocol. For instance, a processor at the client device may communicate with the communications protocol interface 114 via a protocol such as CIFS, OST, or NFS. The client protocol module 402 may be configured to process communications sent and received in such formats.

According to various embodiments, the parser 404 may be configured to receive a stream of data and separate the data into chunks for storage at a networked storage system. The parser 404 may be configured in such a way that two data streams identical except for offset will be reliably parsed into the same chunks. Also, two similar and well-ordered data streams may be reliably parsed in a similar fashion. In this way, data streams may be parsed into chunks in a manner likely to frequently generate duplicate chunks when similar data is provided to the parser. Then, the system can In particular embodiments, the parser 404 is identical to the parser 322 implemented at the networked storage system in communication with the client device. By implementing the same parser at the client device, data can be parsed in the same way at the two devices. For instance, if the same data stream were to be parsed at the client-side and server-side parsers, the chunks that resulted from the different parsing operations may be identical.

In some embodiments, the fingerprinter 406 may generate a fingerprint of a chunk for purposes such as identification and deduplication. A fingerprint may also be referred to as a hash value or a checksum. For instance, the fingerprinter 406 may compute a hash value using a hash function such as MD5, or SHA-1, SHA-256, another Secure Hash Algorithm (SHA) hash function, or any other suitable hash function.

In particular embodiments, the fingerprinter 406 is identical to the fingerprinter 324 implemented at a networked storage system in communication with the client device. By implementing an identical fingerprinter at the client device, data can be fingerprinted in the same way at the two devices. For instance, if the same chunks were to be fingerprinted at the client-side and server-side fingerprinter, the fingerprints that resulted from the different fingerprinting operations may be identical.

According to various embodiments, the chunk cache 416 may be configured to store information about data chunks accessed by the communications protocol interface 114. The chunk cache 416 may include information about chunks that were stored to a networked storage system, chunks that were retrieved from a networked storage system, or both.

According to various embodiments, the chunk cache 416 may be associated with one or more parameter values that help to cabin the size of the chunk cache. For example, the chunk cache 416 may be associated with a limit on the data size of the chunk cache. The data size may restrict the amount of data used by chunks stored within the cache. As another example, the chunk cache 416 may be associated with a limit on the number of chunks stored in the chunk cache 416.

In some implementations, various metadata about a chunk may be stored in the chunk cache 416. For instance, a fingerprint, chunk length, file offset, or other such information may be stored.

In some embodiments, at least some information related to chunks stored in the chunk cache 416 may be indexed. For instance, chunk fingerprints may be stored in an index to facilitate the rapid determination as to whether a chunk is stored in the chunk cache 416. Thus, updating the chunk cache 416 may involve one or more operations to update the chunk index.

In particular embodiments, a chunk may be retained in or discarded from the chunk cache 416 based on how recently and/or how frequently a request to store and/or retrieve the chunk was received. For instance, each chunk may be assigned a heat value in metadata stored in the chunk file. The heat value may indicate information about how and when the chunk has been previously accessed.

In some embodiments, the communications protocol interface logic 408 may be configured with instructions to facilitate various interactions between the client and a server such as a networked storage system. For instance, the communications protocol interface logic 408 may be configured with computer programming language instructions that govern the operation of the other components of the communications protocol interface 114. In one example, the communications protocol interface logic 408 may be configured to facilitate client-side data deduplication, as is discussed with respect to FIG. 5.

According to various embodiments, the server protocol module 410 may be operable to communicate with a remote server such as a networked storage system. For instance, the server protocol module 410 may be configured to communicate using a proprietary protocol. The server protocol module 410 may be operable to perform operations such as determining whether a chunk having a particular fingerprint is stored at the networked storage system. Alternately, or additionally, the server protocol module 410 may be operable to store information to and/or retrieve information from the networked storage system. For example, the server protocol module 410 may be equipped for direct memory access at the networked storage system.

Figure 5:
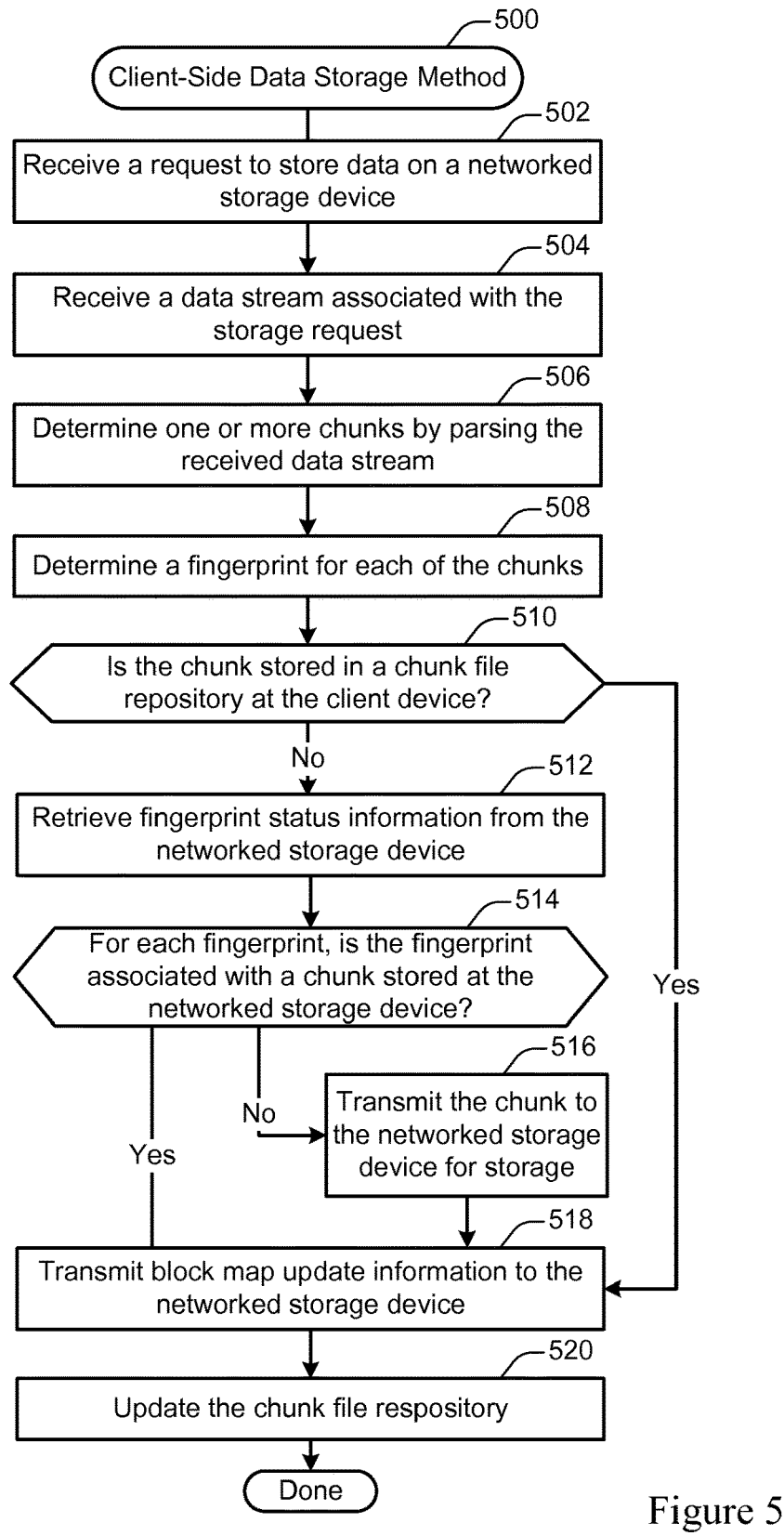
FIG. 5 illustrates an example of a client-side data storage method, performed in accordance with one or more embodiments.

FIG. 5 illustrates an example of a client-side data storage method 500, performed in accordance with one or more embodiments. The method 500 may be performed as part of a procedure in which data is transmitted from a client device to a networked storage system for storage. The method 500 may be performed on a client device, such as the client device 104 shown in FIG. 1.

In particular embodiments, the method 500 may be performed in association with a communications protocol interface configured to facilitate interactions between the client machine and the networked storage system. For instance, the method 500 may be performed in association with the communications protocol interface 114 shown in FIG. 4.

At 502, a request to store data on a networked storage system is received. In some embodiments, the request may be received as part of a backup operation. For instance, the client device may initiate the request in order to store backup data on the networked storage system. Alternately, or additionally, the request may be received as part of an operation to store data for retrieval by other devices via a network.

According to various embodiments, the request may be generated by a processor or other module on the client device. The request may be received at a client protocol module such as the module 402 shown in FIG. 4. For instance, the request may conform to a communications protocol for transmitting information via a network, such as a CIFS, OST, or NFS protocol.

In some implementations, the request may identify various metadata associated with a storage operation. For instance, the request may include one or more headers that identify one or more file names, file sizes, directories, or other such data.

At 504, a data stream associated with the storage request is received. According to various embodiments, the data stream may include data designated for storage. For instance, the data stream may include the contents of one or more files identified in the request received at operation 502.

In some embodiments, the data stream may be provided in accordance with a communications protocol for transmitting information via a network such as CIFS, OST, or NFS. The data stream may be received at a client protocol module such as the module 402 shown in FIG. 4.

At 506, one or more chunks are determined by parsing the received data stream. According to various embodiments, the chunks may be determined by parsing the data stream with the parser 404 shown in FIG. 4. As discussed with respect to FIGS. 3 and 4, the parser may be configured in such a way that two data streams identical except for offset will be reliably parsed into the same chunks. Also, two similar and well-ordered data streams may be reliably parsed in a similar fashion. In this way, data streams may be parsed into chunks in a manner likely to frequently generate duplicate chunks when similar data is provided to the parser.

At 508, a fingerprint is determined for each of the chunks. According to various embodiments, the fingerprint may be determined by the fingerprinter 406. As discussed with respect to FIGS. 3 and 4, the fingerprint may be a hash value generated using a hash function such as MD5 or SHA-1.

At 510, a determination is made as to whether the chunk is stored in a chunk cache at the client device. According to various embodiments, the determination may be made at least in part by using the chunk fingerprint determined by the fingerprinter at operation 508 to query the chunk cache. For example, the chunk cache may include an index of chunk fingerprints for chunks stored in the cache. The chunk fingerprint determined at operation 508 may be used to query this index. As another example, if a fingerprint matching the one determined at operation 508 is found in the chunk cache, the length of the corresponding chunk in the chunk cache may be compared with a chunk length determined by analyzing the chunk created by parsing the file at operation 508 to verify that the correct chunk has been identified.

At 512, fingerprint status information from the networked storage system is retrieved if the chunk is not stored in the chunk cache at the client device. In some embodiments, the fingerprint status information may be retrieved by transmitting the fingerprints determined at operation 508 to the networked storage system. The fingerprints may be substantially smaller than the chunks with which they are associated. Thus, transmitting the fingerprints to the networked storage system may require substantially less bandwidth than transmitting the entire chunks.

In particular embodiments, the fingerprints may be transmitted via the server protocol module 410. The fingerprints may be transmitted as part of a request to the networked storage system to determine whether chunks associated with the fingerprints are stored at the networked storage system. When the request is received, the networked storage system may provide a response that indicates which of the chunks are stored on the networked storage system and/or which of the chunks are not stored on the networked storage system. Techniques for providing fingerprint status information at the networked storage system are discussed in additional detail with respect to the method 600 shown in FIG. 6.

At 514, a determination is made for each fingerprint as to whether the fingerprint is associated with a chunk stored at the networked storage system. According to various embodiments, the determination may be made by processing one or more messages received from the networked storage system as part of the operation 510.

At 516, the chunk is transmitted to the networked storage system if it is determined that chunk fingerprint is associated with a chunk stored at the network storage device. According to various embodiments, the chunk may be transmitted via the server protocol module 410 shown in FIG. 4. The chunk may be stored at the networked storage system in a data store managed by the data store system 326 shown in FIG. 3.

At 518, block map update information is transmitted to the networked storage system. According to various embodiments, the block map update information may be used for updating a block map such as the block map 320 and/or the MDS 318 shown in FIG. 3. The contents of the block map update information may vary based at least in part on the determination made at operation 512.

For example, if it is determined that the chunk is already stored on the networked storage system, then the block map update information may include new block map and/or MDS entries that point to the existing chunk. In this way, references to the existing chunk are maintained and the chunk is not unlinked (i.e. deleted) even if other references to the chunk are removed.

As another example, if instead it is determined that the chunk is not already stored on the networked storage system, then the block map update information may include new block map and/or MDS entries that point to the storage location of the new chunk transmitted at operation 514. For instance, the block map entry may include a data store ID associated with the storage location of the new chunk.

At 520, the chunk cache is updated. According to various embodiments, the chunk cache may be updated to reflect information describing the storage of each of the chunks identified by the parsing of the data stream at operation 506. Depending on factors such as the existing contents of the chunk cache, the chunk cache may be updated in various ways.

In a first example, updating the chunk cache may involve adding the chunk itself and/or metadata describing the chunk to the chunk cache. For instance, the chunk data and/or the chunk fingerprint may be added to the chunk cache. Other information that may be added may include, but is not limited to: the chunk length, the chunk offset within the file, and date or time information describing when the chunk was requested or added to the chunk cache.

In a second example, updating the chunk cache may involve removing information from the chunk cache. For instance, the chunk cache may be subjected to a maximum number of chunks and/or maximum size of chunk data. If a new chunk is added to the chunk cache, then one or more other chunks having a lower priority may be removed from the chunk cache.

In a third example, updating the chunk cache may involve altering or updating information in the chunk cache. For instance, chunk metadata information associated with the chunk stored in the cache may be updated to reflect the storage of a chunk that already existed in the chunk cache. The chunk metadata may include information such as a number of times the chunk has been stored and/or requested, date and/or time information associated with storage and/or retrieval requests, and other types of chunk access information. In particular embodiments, the retention of chunk information in the chunk cache may be subject to a heat factor analysis in which chunks that have been accessed recently and more frequently are more likely to be retained than chunks accessed less recently and less frequently.

Figure 6:
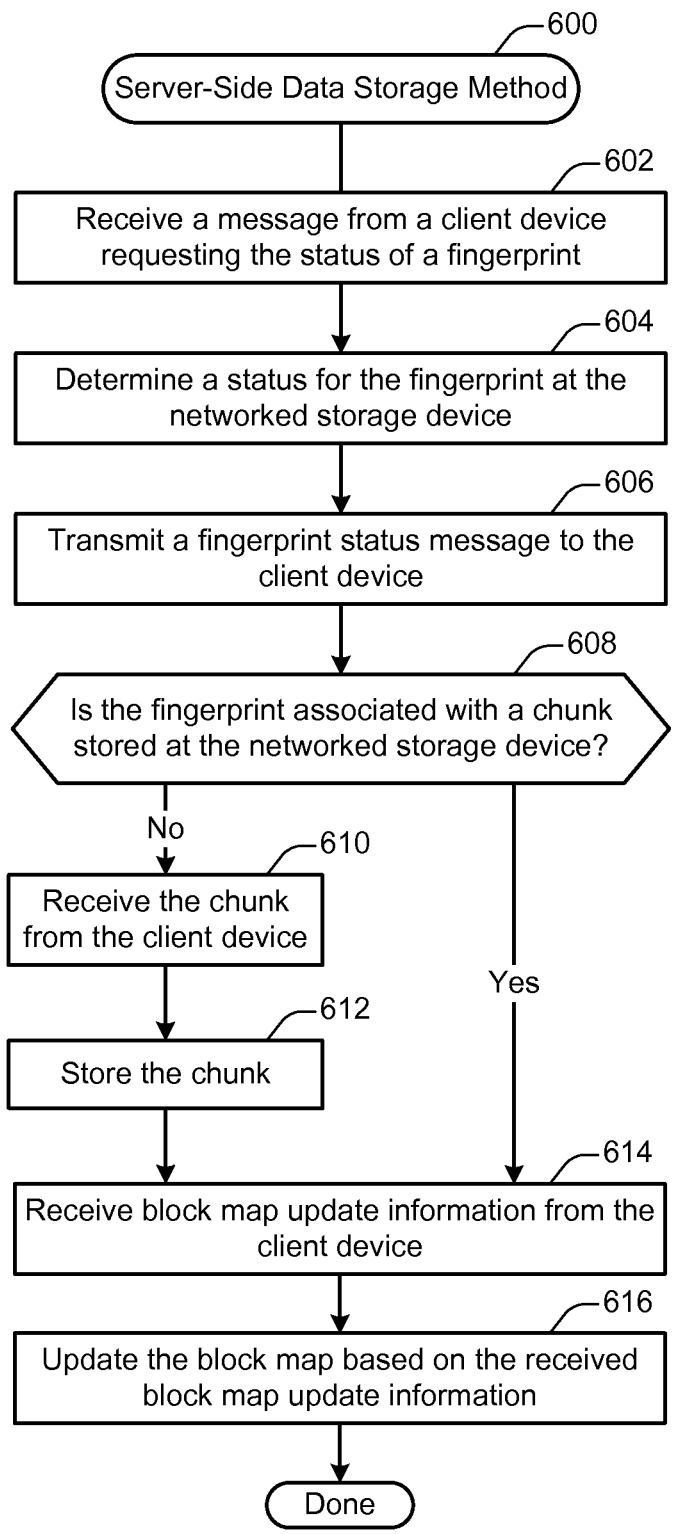
FIG. 6 illustrates a server-side data storage method, performed in accordance with one or more embodiments.

FIG. 6 illustrates a server-side data storage method 600, performed in accordance with one or more embodiments. The method 600 may be performed at a networked storage system such as the system 102 shown in FIG. 1. The method 600 may be performed in conjunction with the method 500 discussed with respect to FIG. 5. For instance, the method 600 may be performed to facilitate the storage of data at a networked storage system, where the data is deduplicated at a client device from which the data originates.

At 602, a message requesting the status of a fingerprint is received at the networked storage system. According to various embodiments, the request message received at operation 602 may include one or more fingerprints that are each associated with a data chunk. The message may be received from a client device in communication with the networked storage system via a network. For instance, the message may be transmitted as part of the information retrieval operation 510 discussed with respect to FIG. 5.

At 604, a determination is made as to the status for the fingerprint identified by the request message received at operation 602. According to various embodiments, determining the status of the fingerprint may involve evaluating whether a chunk corresponding with the fingerprint is stored at the networked storage system. The networked storage system may make this determination by comparing the fingerprint to entries in the block map 320. The fingerprints stored in the block map 320 may be indexed to facilitate a rapid comparison.

At 606, a fingerprint status message is transmitted to the client device. According to various embodiments, the fingerprint status message may indicate whether a chunk associated with the fingerprint is stored at the networked storage system. For instance, the fingerprint status message may indicate the results of the determination made at operation 604.

At 608, a determination is made as to whether the fingerprint is associated with a chunk stored at the networked storage system. According to various embodiments, the determination may be made based on the status information determined at operation 604.

At 610, if the chunk is not stored at the networked storage system, the chunk may be received from the networked storage system. At 612, the chunk is stored. In particular embodiments, the chunk may be transmitted as discussed with respect to operation 514 shown in FIG. 5. For instance, the chunk may be received via the TCP/IP interfaces 302 and 304 shown in FIG. 3. Then the VFS 314 may route the chunk for storage in a data store governed by the data store system 326.

At 614, block map update information is received from the client device. According to various embodiments, the block map update information may be generated as discussed with respect to operation 516 shown in FIG. 5. For example, if it is determined that the chunk is already stored on the networked storage system, then the block map update information may include new block map and/or MDS entries that point to the existing chunk. In this way, references to the existing chunk are maintained and the chunk is not unlinked (i.e. deleted) even if other references to the chunk are removed. As another example, if instead it is determined that the chunk is not already stored on the networked storage system, then the block map update information may include new block map and/or MDS entries that point to the storage location of the new chunk stored at operation 612. For instance, the block map entry may include a data store ID associated with the storage location of the new chunk.

At 616, the block map is updated based on the received block map update information. According to various embodiments, updating the block map may involve entering the changes identified in operation 614 in the block map 320 shown in FIG. 3.

Figure 7:
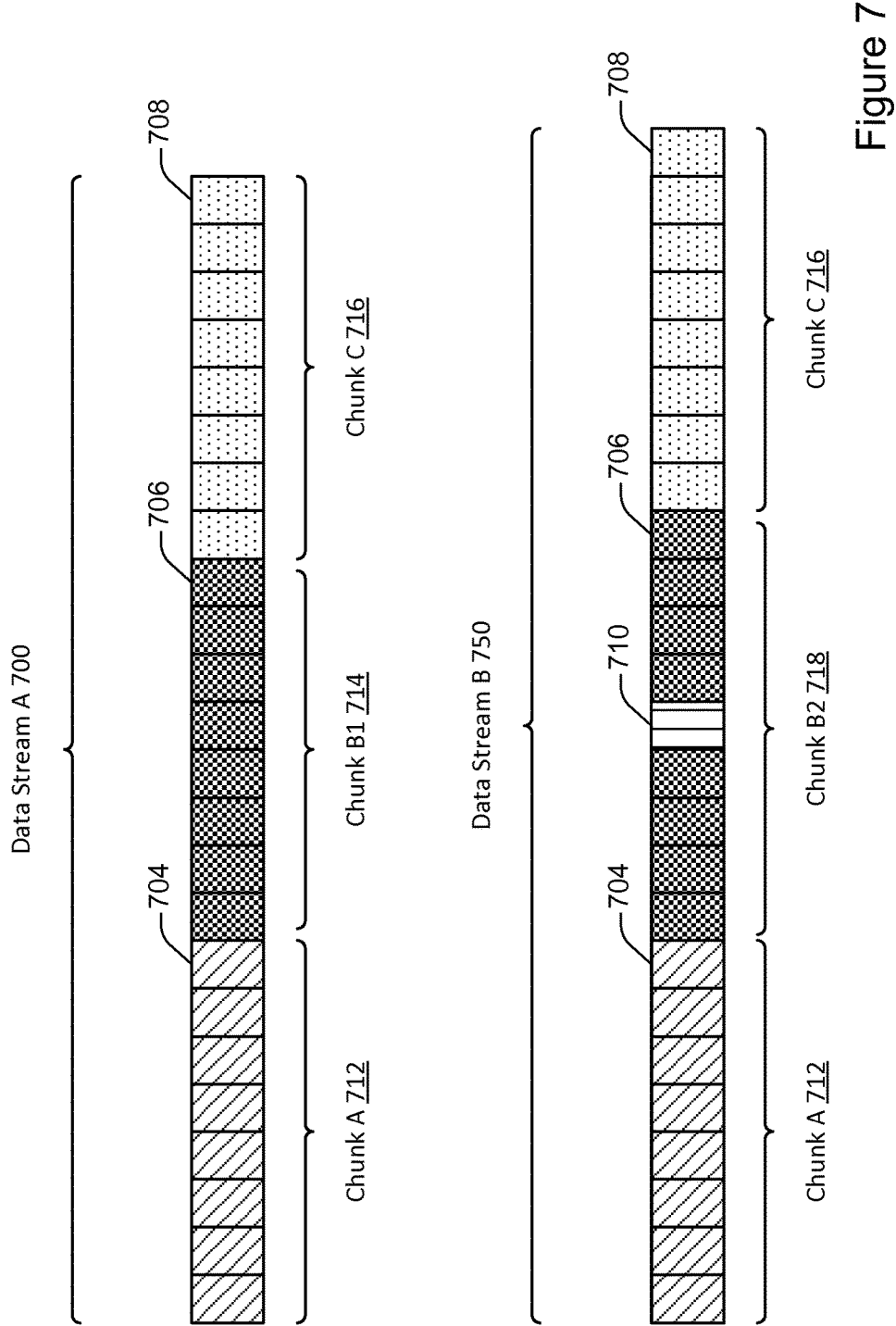
FIG. 7 illustrates a configuration of data streams, presented in accordance with one or more embodiments.

FIG. 7 illustrates a configuration of data streams, presented in accordance with one or more embodiments. FIG. 7 includes data stream A 700 and data stream B 750. The data streams are parsed into chunks 708, 710, 712, and 714 by a parser. The data streams include a plurality of data segments, including data segments 704-710. Each data segment may represent one or more bits, bytes, or any other unit of data size. FIG. 7 shows how two similar but not identical data streams may be parsed similarly to produce, in at least some instances, at least some identical chunks.

In some embodiments, a data stream may be parsed by a parser into chunks. The parser may compute a rolling hash function to identify chunk barriers. For instance, the parser may compute a rolling hash that includes the data segment 704. When the hash is computed, it may be compared with one or more boundary condition criteria to determine whether the parsing of the data stream has reached a chunk boundary. For instance, a chunk boundary may be identified when a rolling hash value is a prime number, is divisible by a designated value, or has some other such mathematical property.

In the example shown in FIG. 7, the data segment 704 represents such a chunk boundary. Accordingly, the parser draws a boundary, and the data between the chunk boundary at the data segment 704 and the previous chunk boundary is designated as chunk A 712. The parser continues parsing the data stream A 700 in this fashion, reaching a new boundary at the data segment 706 and designating the chunk B1 714, and reaching another boundary at the data segment 708 and designating the chunk C 716.

In the example shown in FIG. 7, the data stream B 750 is similar but not identical to the data stream A 700. In the data stream B 750, the data segment 710 has been added. This is a relatively small and specific example modification for the purpose of illustration. Nevertheless, various types of modifications are possible. For instance, data segments may be added, removed, or altered.

According to various embodiments, a parser may parse the data stream B 750 in a manner substantially similar to the parsing of the data stream A 700. For instance, the parser reaches a boundary at the data segment 704 and designating the chunk A 712. Then, the parser reaches another boundary at the data segment 706 and designates the chunk B2 718. Finally, the parser reaches a boundary at the data segment 708 and designates the chunk C 716.

In the example shown in FIG. 7, both data streams include chunk A 712 as well as chunk C 716. Since the same data is included in these chunks as parsed by both data streams, the fingerprints of these chunks are identical as well. Thus, if both data streams are stored to a deduplication storage system, only one copy of chunk A 712 and chunk C 716 need be stored. In contrast, in the example shown in FIG. 7, chunk B1 714 is different than chunk B2 718. Thus, chunks B1 714 and B2 718 will have different fingerprints, and both chunks can be stored in the deduplication storage system.

According to various embodiments, techniques and mechanisms described herein may facilitate the client-side deduplication of data streams such as the ones shown in FIG. 7. For instance, if the data stream B 750 is processed for writing to a networked storage system after the data stream A 750 has already been written to the networked storage system, then only the data chunk B2 718 need be transmitted from the client device to the networked storage system. In particular embodiments, such client-side deduplication may be performed even when data write requests are provided at the client device via a standard and/or non-proprietary communication protocol that does not conventionally support client-side deduplication.

Figure 8:
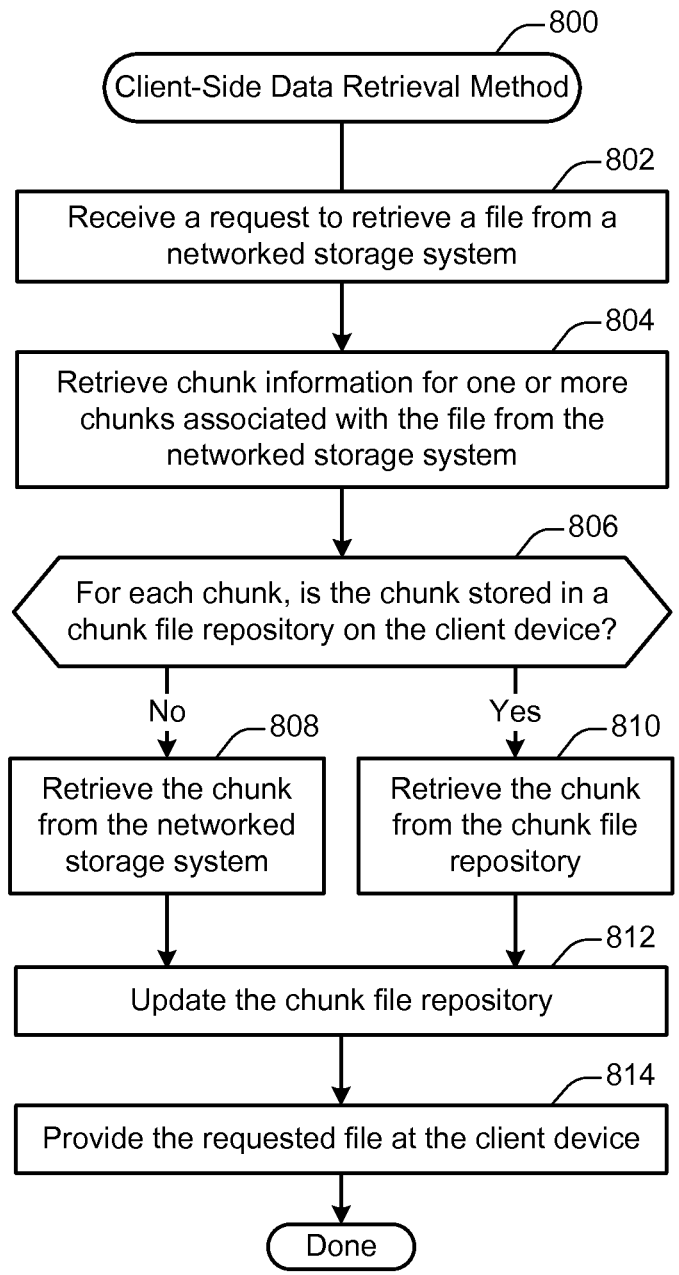
FIG. 8 illustrates an example of a client-side data retrieval method, performed in accordance with one or more embodiments.

FIG. 8 illustrates an example of a client-side data retrieval method 800, performed in accordance with one or more embodiments. The method 800 may be performed at a client device such as the client device 104 shown in FIG. 1. The method 800 may be performed in order to retrieve information from a networked storage system. For instance, a processor at the client device 104 may issue an instruction to the communications protocol interface 114 to retrieve a file.

At 802, a request to retrieve a file from a networked storage system is received. According to various embodiments, the request may be received at a client protocol module associated with a communications protocol interface. For instance, the request may be received at the client protocol module 402 shown in FIG. 4. As discussed with respect to FIG. 4, the communications protocol interface 114 may be operable to communicate with other modules at the client device via a communications protocol such as CIFS, NFS, or OST. These communications may be routed through the client protocol module 402, which may process requests for other components of the communications protocol interface 114.

In particular embodiments, the request to retrieve the file may be received as part of a restore operation. Alternately, or additionally, the request may be received as part of an operation to access network-accessible files available to various computing devices on a network. In some instances, the requested file may be one of many files for which retrieval requests are received.

At 804, chunk information for one or more chunks associated with the file is retrieved from the networked storage system. According to various embodiments, the chunk information may be retrieved by transmitting and receiving communications through a module such as the server protocol module 410 and/or the TCP/IP modules 412 and 414 shown in FIG. 4.

In some embodiments, the chunk information retrieved at operation 804 may be used to identify one or more chunks included in the requested file and to determine for each chunk whether the chunk is stored in the chunk cache at the client device or needs to be retrieved from the networked storage system. For instance, the chunk information retrieved at operation 804 may include, but is not limited to: a fingerprint associated with the chunk, the length of the chunk, and a file offset that indicates where in the requested file the chunk is located.

In some implementations, the chunk information retrieved at operation 804 may be retrieved by identifying the file requested at operation 802 to the networked storage system. For instance, the file identification information may be used by the networked storage system to look up one or more entries for the file in the metadata server 318 and/or the block map 320 at a networked storage system such as the system 300 shown in Figure.

At 806, a determination is made for each chunk as to whether the chunk is stored in a chunk cache on the client device. According to various embodiments, the determination may be made at least in part by using the information retrieved at operation 804 to query the chunk cache. For example, the chunk cache may include an index of chunk fingerprints for chunks stored in the cache. The chunk fingerprint retrieved at operation 804 may be used to query this index. As another example, if a fingerprint matching the one retrieved at operation 804 is found in the chunk cache, the length of the corresponding chunk in the chunk cache may be compared with the chunk length retrieved at operation 804 to verify that the correct chunk has been identified.

At 808, if the chunk is not stored in the chunk cache, the chunk is retrieved from the networked storage system. According to various embodiments, retrieving the chunk from the networked storage system may involve transmitting a chunk request message to the networked storage system. The chunk request message may include, for instance, the chunk fingerprint received at operation 804 or some other chunk identifier. In response to the chunk request message, the networked storage system may be operable to transmit the chunk to the client device.

In particular embodiments, the chunk may be received at the client device by the communications protocol interface. For instance, as discussed with respect to FIG. 4, the communications protocol interface 114 may communicate with the networked storage system via the server protocol module 410 and the TCP/IP interfaces 412 and 414.

At 810, if the chunk is stored in the chunk cache, the chunk is retrieved from the chunk cache. In some embodiments, retrieving the chunk from the chunk cache may involve reading the chunk data from a memory storage location at which the chunk is located within the client device.

At 812, the chunk cache is updated. According to various embodiments, the chunk cache may be updated to reflect the request for the chunk retrieved at operation 808 or operation 810. In a first example, updating the chunk cache may involve adding the chunk itself and/or metadata describing the chunk to the chunk cache. For instance, the chunk data and/or the chunk fingerprint may be added to the chunk cache. Other information that may be added may include, but is not limited to: the chunk length, the chunk offset within the file, and date or time information describing when the chunk was requested or added to the chunk cache.

In a second example, updating the chunk cache may involve removing information from the chunk cache. For instance, the chunk cache may be subjected to a maximum number of chunks and/or maximum size of chunk data. If a new chunk is added to the chunk cache, then one or more other chunks having a lower priority may be removed from the chunk cache.

In a third example, updating the chunk cache may involve altering or updating information in the chunk cache. For instance, if it is determined at operation 806 that the chunk is in the cache, the chunk metadata information associated with the chunk stored in the cache may be updated to reflect the chunk request received at operation 802. The chunk metadata may include information such as a number of times the chunk has been stored and/or requested, date and/or time information associated with storage and/or retrieval requests, and other types of chunk access information. In particular embodiments, the retention of chunk information in the chunk cache may be subject to a heat factor analysis in which chunks that have been accessed recently and more frequently are more likely to be retained than chunks accessed less recently and less frequently.

At 814, the requested file is provided at the client device. According to various embodiments, providing the requested file at the client device may involve combining the chunks retrieved at operations 808 and/or operations 810 to produce a file. For instance, the chunk file offset information retrieved at operation 804 may be used to order and position the chunks within a file. The file that is composed of the different chunks may then be provided as a data stream over a bus to another module at the client device such as a memory location, a persistent storage module, or a processor.

Because various information and program instructions may be employed to implement the systems/methods described herein, the present invention relates to non-transitory machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method, comprising:
    at a client device comprising a processor and memory, identifying a fingerprint for a data chunk by applying a hash function to the data chunk via the processor, the data chunk determined by parsing a data stream at the client device, the data stream designated for storage at a networked storage system, using functions in a custom communications protocol interface, the custom communications protocol interface including a parser and a fingerprinter for facilitating client-side deduplication, the custom communications protocol interface being at the client device and being operable to communicate with at least one other module at the client device via a standard communications protocol, the custom communications protocol interface at the client device being operable to communicate with the networked storage system using at least one non-standard interaction;

determining whether the data chunk is stored in a local chunk cache at the client device;

verifying that the data chunk is correctly identified by comparing a first length of the data chunk determined by parsing the data stream with a second length of the data chunk stored in the local chunk cache; and in response to a determination that the data chunk is not stored in the local chunk cache, determining whether the data chunk is stored at the networked storage system by transmitting the fingerprint to the networked storage system via the network;

in response to receiving a message from the networked storage system that the data chunk is not stored at the networked storage system, transmitting the data chunk and a block map update request message to the networked storage system via a network, the block map update request message including information to update a block map at the networked storage system, the block map identifying a designated memory location at which the data chunk is to be stored at the networked storage system; and after the block map update request message is transmitted to the network storage system, storing the data chunk in a local chunk cache.

2. The method recited in claim 1, wherein determining whether the chunk is stored at the networked storage system further comprises receiving a fingerprint status message from the networked storage system, the fingerprint status message indicating whether the chunk associated with the fingerprint is stored at the networked storage system.

3. The method recited in claim 1, wherein determining whether the data chunk is stored in the local chunk cache comprises comparing the fingerprint for the data chunk with a fingerprint index associated with the local chunk cache.

4. The method recited in claim 1, wherein the designated memory location identifies an existing memory location associated with the data chunk when it is determined that the data chunk is stored at the networked storage system at the existing memory location.

5. The method recited in claim 1, wherein the data chunk is determined via a rolling hash parsing technique operable to generate at least some identical chunks when parsing different but overlapping data streams.

6. The method recited in claim 1, wherein the networked storage system is operable to store deduplicated data based on storage requests received via the network.

7. The method recited in claim 1, wherein the data stream is generated at the client device via a network storage protocol.

8. The method recited in claim 7, wherein the network storage protocol is a communications protocol selected from the group consisting of: the Network File System (NFS) protocol, the Common Internet File System (CIFS) protocol, and the Open Storage (OST) protocol.

9. The method recited in claim 1, wherein the hash function is selected from a group consisting of: MD5 and SHA-1.

10. A device comprising:

memory operable to store a fingerprint for a data chunk generated by applying a hash function to the data chunk, the data chunk determined by parsing a data stream at the device, the data stream designated for storage at a networked storage system;

a processor operable to:

determine whether the data chunk is stored in a local chunk cache at the client device;

verify that the data chunk is correctly identified by comparing a first length of the data chunk determined by parsing the data stream with a second length of the data chunk stored in the local chunk cache; and in response to a determination that the data chunk is not stored in the local chunk cache, determine whether the data chunk is stored at the networked storage system by transmitting the fingerprint to the networked storage system via the network; and a custom communications protocol interface operable to transmit a the data chunk and block map update request message to the networked storage system via a network in response to receiving a message from the networked storage system that the data chunk is not stored at the networked storage system, the block map update request message including information for updating a block map at the networked storage system, the block map identifying a designated memory location at which the data chunk is stored at the networked storage system, the custom communications protocol interface including a parser and fingerprinter for facilitating client-side deduplication, the custom communications protocol interface being at the client device and being operable to communicate with at least one other module at the client device via a standard communications protocol, the custom communications protocol interface at the client device being operable to communicate with the networked storage system using at least one non-standard interaction, wherein the processor is further configured to store the data chunk in the local chunk cache, after the block map update request message is transmitted to the network storage system.

11. The device recited in claim 10, wherein determining whether the data chunk is stored at the networked storage system further comprises receiving a fingerprint status message from the networked storage system, the fingerprint status message indicating whether the chunk associated with the fingerprint is stored at the networked storage system.

12. The device recited in claim 10, wherein determining whether the data chunk is stored in the local chunk cache comprises comparing the fingerprint for the data chunk with a fingerprint index associated with the chunk cache.

13. The device recited in claim 10, wherein the designated memory location identifies an existing memory location associated with the data chunk when it is determined that the data chunk is stored at the networked storage system at the existing memory location.

14. One or more non-transitory computer readable media having instructions stored thereon for performing a method, the method comprising:

at a client device comprising a processor and memory, identifying a fingerprint for a data chunk by applying a hash function to the data chunk via a processor, the data chunk determined by parsing a data stream at the client device, the data stream designated for storage at a networked storage system, using functions in a custom communications protocol interface, the custom communications protocol interface including a parser and fingerprinter for facilitating client-side deduplication, the custom communications protocol interface being at the client device and being operable to communicate with at least one other module at the client device via the standard communications protocol, the custom communications protocol interface at the client device being operable to communicate with the networked storage system using at least one non-standard interaction;

determining whether the data chunk is stored in a local chunk cache at the client device;

verifying that the data chunk is correctly identified by comparing a first length of the data chunk determined by parsing the data stream with a second length of the data chunk stored in the local chunk cache;

in response to a determination that the data chunk is not stored in the local chunk cache, determining whether the data chunk is stored at the networked storage system by transmitting the fingerprint to the networked storage system via the network; and in response to receiving a message from the networked storage system that the data chunk is not stored at the networked storage system, transmitting the data chunk and a block map update request message to the networked storage system via a network, the block map update request message including information to update a block map at the networked storage system, the block map identifying a designated memory location at which the data chunk is to be stored at the networked storage system;

wherein after the block map update request message is transmitted to the network storage system, storing the data chunk in a local chunk cache.

15. The one or more non-transitory computer readable media recited in claim 14, the method further comprising:

when it is determined that the data chunk is not stored in the local chunk cache, determining whether the data chunk is stored at the networked storage system by transmitting the fingerprint to the networked storage system via the network.

* * * * *